Oct. 1, 1935.  O. E. MARK  2,016,015
GEAR SHIFTING MECHANISM
Filed Aug. 28, 1933   5 Sheets-Sheet 1

INVENTOR
OVID E. MARK
BY A. B. Bowman
ATTORNEY

Oct. 1, 1935. O. E. MARK 2,016,015
GEAR SHIFTING MECHANISM
Filed Aug. 28, 1933 5 Sheets-Sheet 3

INVENTOR
OVID E. MARK
BY A. B. Bowman
ATTORNEY

Oct. 1, 1935.　　　　O. E. MARK　　　　2,016,015
GEAR SHIFTING MECHANISM
Filed Aug. 28, 1933　　　　5 Sheets-Sheet 4

INVENTOR
OVID E. MARK
BY A. B. Bowman
ATTORNEY

Patented Oct. 1, 1935

2,016,015

UNITED STATES PATENT OFFICE 2,016,015

GEAR SHIFTING MECHANISM

Ovid E. Mark, San Diego, Calif.

Application August 28, 1933, Serial No. 687,149

12 Claims. (Cl. 74—334)

My invention relates to gear shifting mechanisms, and the objects of my invention are:

First, to provide a gear shifting mechanism which is particularly designed to operate the transmission of a vehicle;

Second, to provide a gear shifting mechanism which substitutes a selector or control in place of the gear shift lever, the actual shifting operating being accomplished by the clutch pedal;

Third, to provide a gear shifting mechanism which is fool proof in its operation, the various gears being moved to a neutral position before another gear is selected, this being accomplished automatically with the operation of the clutch pedal;

Fourth, to provide a gear shifting mechanism which is an improvement on my patent for gear shifting mechanism for car transmissions, No. 1,750,236;

Fifth, to provide a gear shifting mechanism which is partially automatic in its operation, there being provided means for automatically advancing the selector from low position to high upon operation of the clutch pedal so that one may set the selector for its low position, and pick up to high speed without again operating the selector.

Sixth, to provide a gear shifting mechanism which incorporate another automatic feature, namely, an arrangement whereby the transmission may be alternated between second position and high position merely by the operation of the clutch pedal, thereby eliminating to a large extent the need for manual operation of the selector, the transmission shifting mechanism being further arranged so that this alternating position is arrived at automatically by reason of the automatic advancing of the gears in shifting the transmission from low to high.

Seventh, to provide a gear shifting mechanism which may be alternated between reverse and low speeds so as to greatly facilitate the parking of a vehicle or other maneuvers requiring a back and forth movement.

Eighth, to provide a gear shifting mechanism which may be attached to the conventional transmission or may be incorporated integrally therewith;

Ninth, to provide a gear shifting mechanism which incorporates a novel means of transposing the one-way operating movement of the clutch pedal to the necessary two-way operating movement of the gear shifter forks;

Tenth, to provide a gear shifting mechanism which is capable of long and continued use without danger of failure; and Eleventh, to provide on the whole a novelly and simply constructed gear shifting mechanism which is efficient in its actions, easily installed, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Similar characters of reference refer to similar parts and portions throughout the several views of the drawings.

Housing 1, low and reverse shifter fork 2, second and high shifter fork 3, shifter rods 4 and 5, yoke 6, link 7, lever 8, racks 9, casing 10, shaft 11, gear wheels 12, shifter fingers 13, carriage frame 14, slide plates 15, connecting members 16, catches 17, springs 18, keeper bar 19, springs 20, carriage shifting means 21, selector shaft 22, shifter finger cams 23, control means 24, alternator units 25, alternator cams 26, centering disk 27, centering lever 28, spring 29, progressing ratchet 30, and progressing lever 31 constitute the principal parts and portions of my novel gear shifting mechanism.

A flat rectangular housing 1 is provided which includes a portion 1a adapted to fit over a conventional transmission in place of its cover. This portion is open at its under side to expose the interior of the transmission. The remaining portion 1b of the housing extends laterally to one side of the transmission. In place of the conventional shifter fork there is provided a low and reverse shifter fork 2 and a second and high shifter fork 3. These members comprise fork portions 2a and 3a respectively, slide portions 2b and 3b respectively which are adapted to fit upon the conventional guide rods of the transmission, and operating arms 2c and 3c respectively.

The laterally disposed portion 1b of the housing slidably supports a pair of shifter rods 4 and 5 which extend longitudinally in parallel disposed relation with the transmission. The shifter rod 4 carries a yoke 6 which extends laterally therefrom and is adapted to engage the extremity of the arm 2c, forming a part of the low and reverse shifter fork 2. The reciprocal movement of the shifter rod 4 causes a corresponding movement of the shifter fork 2 so that the transmission connected therewith may be moved from a reverse to a low position or vice versa. The other shifter rod 5 is connected by means of a link 7 to a lever 8 which is fulcrumed intermediate its ends on a journal supported from the casing 1. Said lever is connected at its other end with the arm 3c of the shifter fork 3. This arrangement enables the shifter rods 4 and 5 to move identical distances, yet enables the transmission gear which operates between second and high positions to move a less distance than that which shifts between low and reverse positions. This arrangement is necessary in connection with synchro-mesh transmissions.

An elongated casing 10 is provided which is spaced rearwardly from the laterally disposed portion 1b of the housing 1. Said casing 10 is provided with a pair of spaced apart partitions 10a, at the upper ends of which are provided sets of sleeves 10b arranged in axially alined pairs. Slidably mounted between the partitions 10a are a pair of racks 9 having reduced downwardly directed teeth and guide rod portions 9a at their extremities fitted in the sleeves 10b. The guide rod portions at the end of the racks towards the housing 1 protrude through the casing 10 and are connected with the shifter rods 4 and 5 by means of suitable flexible couplings 4a and 5a respectively.

Below the sleeves 10b there are provided other sets of sleeves 10c which receive guide rod portions 9b of another pair of racks 9 having upwardly directed teeth. A shaft 11 supported by the housing 10 is disposed between the upper and lower set of racks. Said shaft carries a pair of gear wheels 12. Each wheel co-acts with the upper and lower members of each pair of racks so that the corresponding rod portions 9a and 9b are moved in opposite directions. The lower racks are provided with upwardly directed side plates 9c while the upper racks are provided with downwardly directed side plates 9c, there being provided one side plate for each rack.

At the rear end facing the extended rear portion of the casing 10, each side plate is provided with a connecting means 9d which pivotally supports a shifter finger 13. Four such shifter fingers 13 are provided, these fingers extending substantially horizontally towards the rear extremity of the casing 10.

At the extended portion of the casing there is provided a carriage frame 14. The carriage frame 14 comprises a substantially channel shaped lower portion 14a, the legs thereof extending downwardly and arranged to slide on tracks 10d formed in the bottom of the casing 10 at its side margins. Secured to the inverted channel member 14a are a pair of channel members 14b which are arranged side by side with their leg portions extending upwardly. These leg portions are inturned at their upper extremities, as indicated by 14c. The casing 10 is provided with a pair of longitudinally extending shoulders 10e against which the inturned outer legs of the pair of channel members 14b bear so that the carriage is limited to a sliding movement. The bottom portion of each channel member 14b receives a slide plate 15. Each slide plate 15 has an upturned end 15a at its forward extremity facing the shifter fingers 13.

Figure 13:
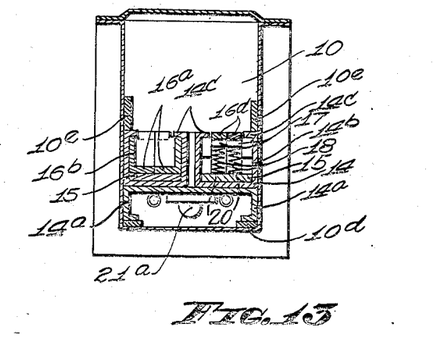
Figure 14:
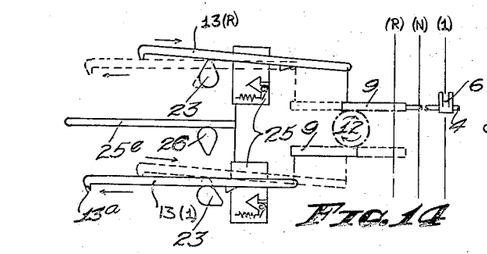
Fig. 14 is a diagrammatical view illustrating the manner in which the low and reverse shifting movements are accomplished.
Figure 15:
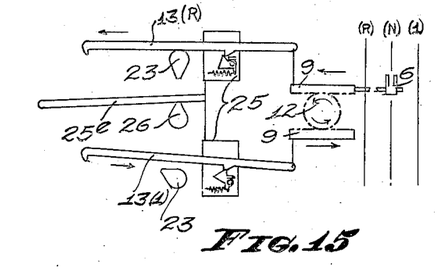
Fig. 15 is another diagrammatical view illustrating the manner in which the alternating action between low and reverse is accomplished.
Figure 16:
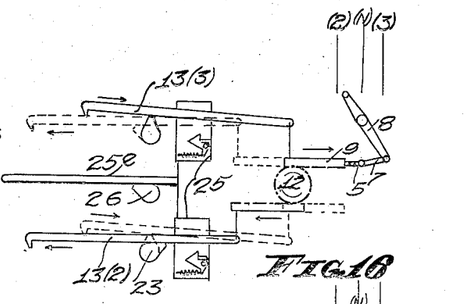
Fig. 16 is another diagrammatical view illustrating the manner in which the second and high shifting operations are accomplished.
Figure 17:
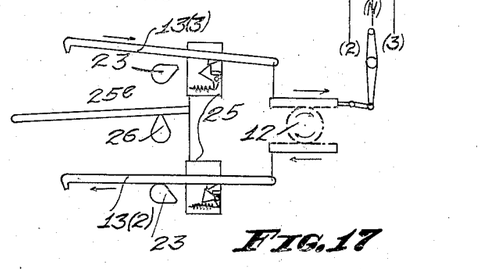
Fig. 17 is another diagrammatical view illustrating the manner of alternating between second and high.

Each slide plate 15 supports a pair of connecting members 16. Each connecting member comprises a flat base portion 16a which rests on the slide plate, an upwardly directed side wall 16b along one side which fits adjacent the upwardly directed leg of the corresponding channel member 14b so as to be retained by the inturned extremity 14c, as shown best in Fig. 13. The end of each connecting member facing the shifter finger 13 is provided with an upwardly directed catch portion 16c which is adapted to co-act with the depending hook portion 13a at the extremity of the corresponding shifting finger, there being provided one connecting member 16 for each shifting finger.

The end of each slide plate 15 opposite from an upturned extremity 15a journals a pair of catches 17 which extend rearwardly toward the rear extremity of the casing 10. Each catch is provided with a downwardly directed catch lug 17a at its extremity. Above its point of connection with the slide plate 15, each catch 17 is provided with a shoulder 17b, and rearwardly of said shoulder 17b said catch is connected by means of a spring 18 with said plate 15 so that the catch lug 17a is normally directed downwardly. The rearward extremity of each connecting member 16 is provided with a hook portion 16d which overhangs the corresponding catch 17 and engages the shoulder 17b thereof. Each connecting member 16 is so arranged that it is capable of a limited longitudinal movement with respect to the slide plate; and when so moved pulls upon the corresponding catch 17 so as to raise the catch lug 17a thereof.

Near its rear extremity the carriage frame 14 supports a transversely disposed keeper bar 19 which is adapted to be engaged by the four catches 17. The slide plates 15 are adapted to move relative to the carriage frame but are yieldably held in rearward positions in which the catches 17 are in connection with the keeper bar by means of springs 20 which are anchored at their one end to the carriage frame and at their other ends to a lug 15b depending from the forward extremity of the corresponding slide plates.

Figures 18, 19:
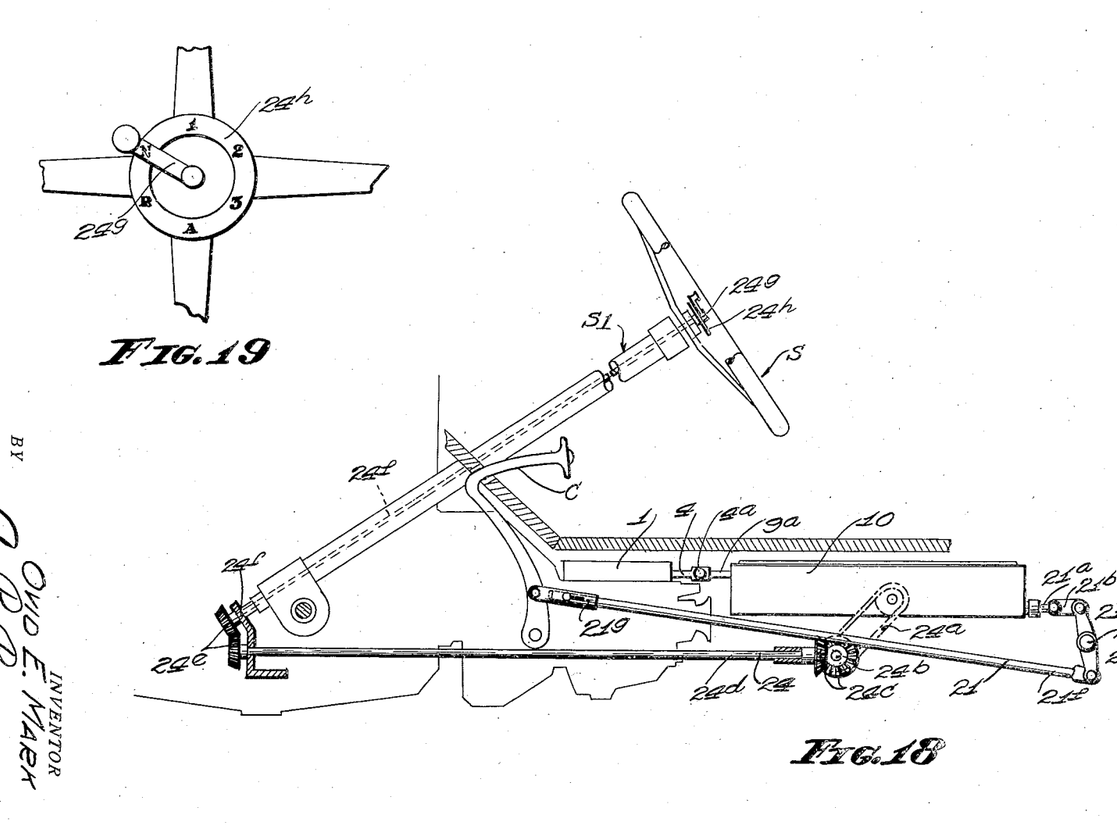
Fig. 18 is a fragmentary, substantially diagrammatical side view of my mechanism showing in outline the adjacent portions of the vehicle and the manner of connecting the mechanism with the clutch pedal and the steering wheel
Fig. 19 is a fragmentary elevational view of the steering wheel illustrating the dial and handle used to control the mechanism.

Extending rearwardly from the carriage frame 14 and through the rear extremity of the casing 10 is a carriage shifting rod 21a forming a part of a carriage shifting means 21 connected to the clutch pedal, designated C, of the vehicle as shown in Fig. 18. Said means includes a suitable connecting member 21b linking the rod 21a with an arm 21c of a cross shaft 21d which also carries an arm 21e. The latter arm is connected by a rod 21f to the clutch pedal through a sliding connection 21g so arranged as to permit an initial movement of the clutch pedal before operation of the shifting mechanism. This arrangement enables the clutch to be disengaged without affecting the mechanism if desired.

In order to explain the operation of the gear shift mechanism, the four shifting fingers 13 are additionally designated by characters representing the function they perform in operating the transmission mechanism; thus one of the shifting fingers is designated 1 as this finger moves the sliding gear of the transmission to its low position. Similarly, the other three shifting fingers are designated (R) for reverse, (2) for second, and (3) for high, inasmuch as these fingers operate on the shifting gears of the transmission to set the transmission for first, second, and high speeds, respectively. The shifting fingers 13 for low and reverse are connected with the shifter rod 4, and move in opposite directions by reason of their connection with the rack 9 and the gear 12. The other pair of shifter fingers are similarly connected with the shifter rod 5, and these likewise move in opposite directions. The low (1) and reverse (R) shifting fingers co-act with the pair of connecting members 16 and catches 17 associated with one slide plate, while the shifter fingers for second (2) and high (3) speeds are associated with the connecting members and catches of the other slide plate. When both of the connecting members 16, associated with either slide, are engaged by the shifter fingers, the corresponding catches 17 are raised so as to clear the keeper bar 19 and permit the slide plate to move rearwardly or rather to be held against further movement while the carriage frame 14 is pulled further. However, if only one member of either pair of shifter fingers; that is, low (1) or reverse (R) shifter finger of one set or the second (2) or high (3) shifter finger of the other set is raised, the corresponding slide plate will not move relative to the carriage frame for one of the catches 17 will remain engaged with the keeper bar 19; thus by raising any one of the four shifter fingers, the other member of the corresponding pair remains engaged with the corresponding connecting member 16, and is pulled when the carriage frame 14 is moved. The other pair of shifter fingers both being connected with their respective connecting members 16 cannot be moved further than the neutral position of the shifting gear with which they are connected as the pair of fingers must move in opposite directions but are prevented by the catches 16c.

A selector shaft 22 is disposed between the carriage frame and rear partition 10a and transversely of the housing 10 so as to journal in the side walls thereof. The selector shaft 22 carries four cams 23. The selector shaft and cams are arranged under the several shifter fingers, and are so disposed that said fingers are lifted one at a time depending upon the position of the selector shaft.

The selector shaft 22 is connected with a suitable control means 24, shown in Fig. 18, comprising a sprocket and chain drive 24a connecting a cross shaft 24b with the selector shaft 22, gear means 24c connecting the shaft 24b with a forwardly extending shaft 24d terminating at the lower end of the steering column S1 of the vehicle, gears 24e connecting the shaft 24d with a rod 24f extending upwardly through the steering column to the steering wheel S, and a handle 24g at the end of the rod 24f. The steering column supports a dial 24h. Four places on the dial are designated (R), (1), (2), and (3) or in any other manner to indicate the various speeds of the vehicle. There is also a position, designated (N), for neutral position in which all of the shifting fingers are in their lower positions. A sixth position of the selector shaft is reserved which is indicated on the dial as (A), representing the term "alternate."

By means of an apparatus associated with the selector shaft and shifter finger which when the shaft is designating this position, the gear shifting mechanism is rendered at least partially automatic. This apparatus comprises two alternator units 25, one disposed between the low and reverse shifting fingers, and the other disposed between the second and high shifting fingers. Each alternator unit comprises a vertically disposed rectangular supporting plate 25a on either side of which is pivotally supported a catch lever 25b. Each catch lever is yieldably held against a stop 25c by means of a spring 25d. The stops 25c project laterally from the supporting plate 25a below the shifter fingers between which the supporting plate is mounted. When the several catch levers 25b are in engagement with the stops 25d, they provide a vertical forward face and a sloping rearward face. Each shifter finger 13 is provided with a catch lug 13b which projects downwardly therefrom. Normally the catch lugs 13b clear the catch levers 25b, but if the alternator units are raised a predetermined amount, these members engage. Inasmuch as the several catch levers are adapted to rotate in a counter-clockwise or rearward direction, as in the several illustrations, they do not raise the respective shifter finger when said fingers are moving rearwardly, but cause these fingers to raise when they are moving forwardly.

The supporting plate 25a of each alternator unit 25 is secured to an arm 25e which extends rearwardly over the selector shaft 22, and is pivotally supported from a bracket 10f at the rear end of the housing. The arms 25e are engaged by cams 26 which are so positioned that they raise the arms 25e when the pointer 24h connected with the selector shaft indicates the character A on the dial 24g.

Figure 7:
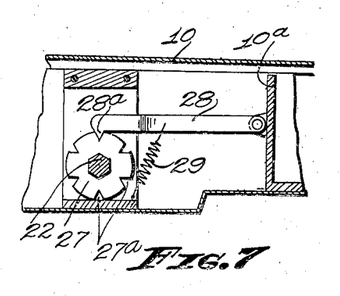
Fig. 7 is another fragmentary sectional view through 7—7 of Fig. 1.
Figure 8:
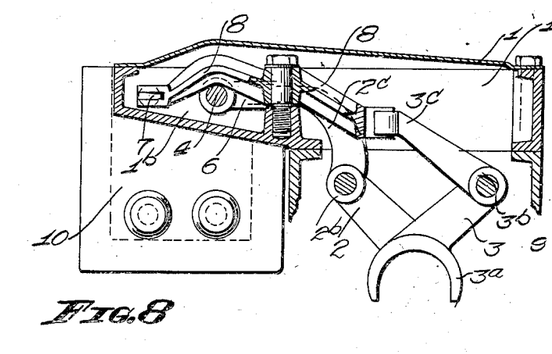
Fig. 8 is a transverse sectional view through 8—8 of Fig. 1.
Figure 9:
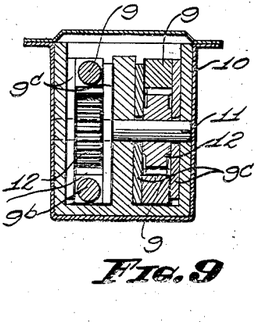
Fig. 9 is a transverse sectional view through 9—9 of Fig. 2.
Figure 10:
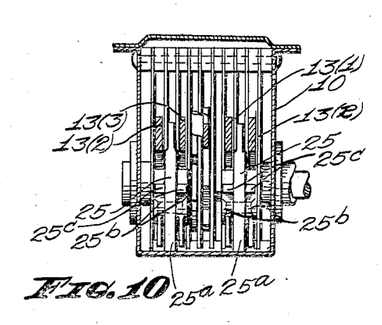
Figs. 10, 11, 12, and 13 are transverse sectional views through 10—10, 11—11, 12—12, and 13—13, of Fig. 1 respectively, with parts and portions in elevation to facilitate the illustration.
Figure 11:
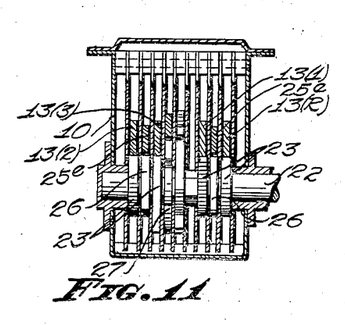
Figure 12:
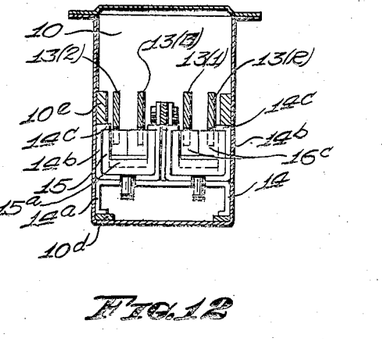

The selector shaft 22 is centered in each of its six positions by means of a centering disk 27. Said centering disk is provided with six notches 27a therein which are engaged by a lever 28. Said lever having a depending lug 28a at its one extremity and pivotally supported at its other extremity from the adjacent partition 10a, as shown in Fig. 7. A spring 29 is so positioned as to pull downwardly on the lever 28 and hold it in engagement with the centering disk 27.

Figure 1:
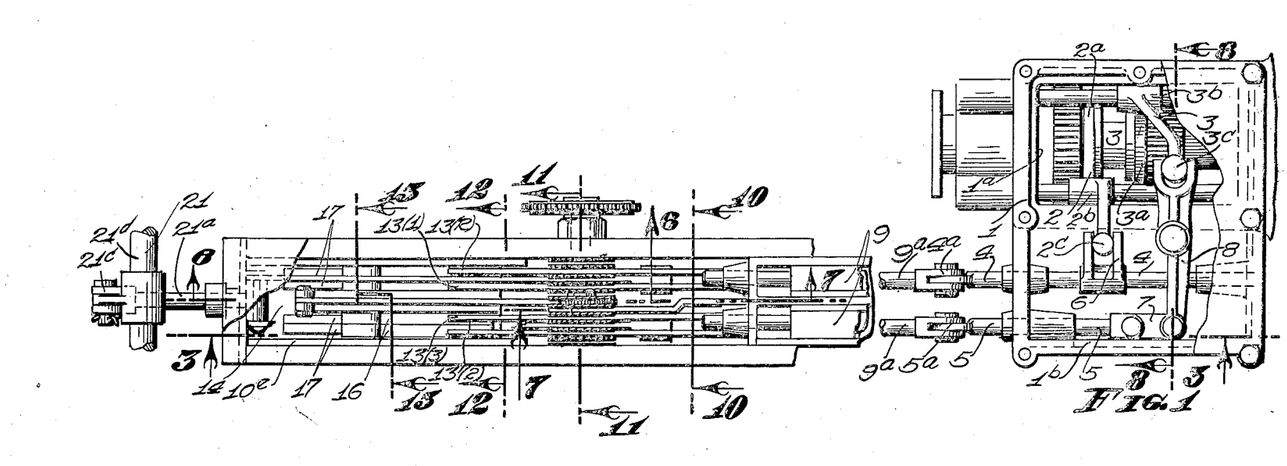
Figure 1 is a fragmentary partial-sectional partial-plan view of my gear shifting mechanism shown in conjunction with a transmission.
Figure 2:
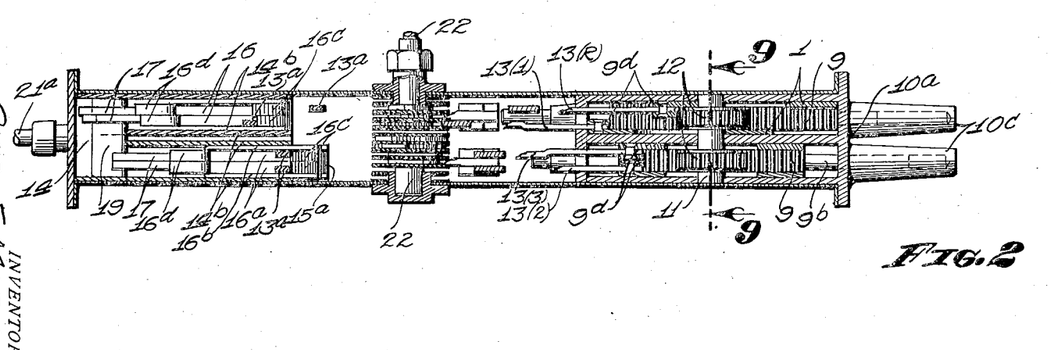
Fig. 2 is a longitudinal sectional view thereof through 2—2 of Fig. 3 with parts and portions shown in elevation.
Figure 3:
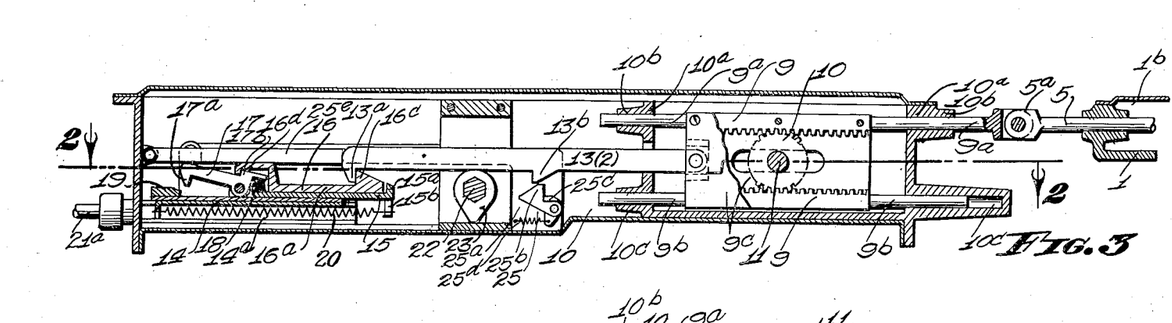
Fig. 3 is another longitudinal sectional view thereof at right angles to Fig. 2 and taken through 3—3 of Fig. 1.
Figure 4:
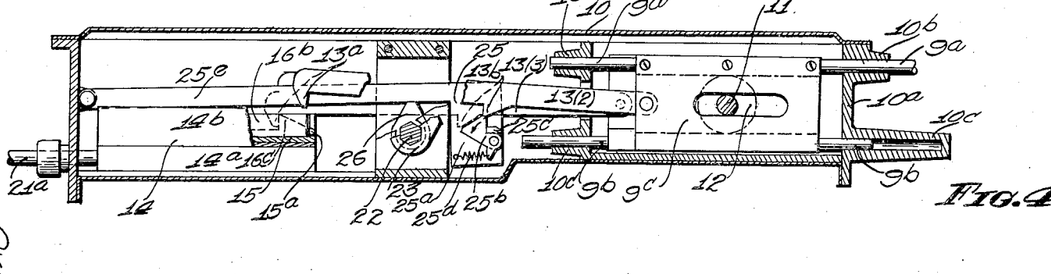
Fig. 4 is a fragmentary sectional view similar to Fig. 3 showing the portions of the gear shifting mechanism in one position assumed when set to accomplish an alternating action.
Figure 5:
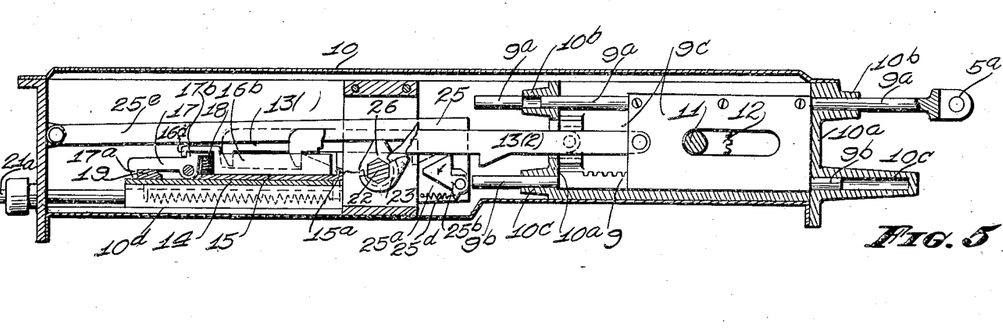
Fig. 5 is a similar sectional view with the parts in another position when accomplishing this function.
Figure 6:
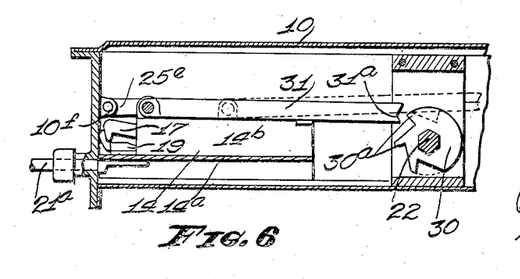
Fig. 6 is a fragmentary sectional view through 6—6 of Fig. 1.

In order to increase the automatic nature of my gear shifting mechanism, there is provided a progressing ratchet 30 which is mounted on the shaft 22 approximately midway between the sides of the casing 10. Said ratchet 30 is provided with three teeth 30a which are approximately 60° apart so that the distance between the teeth is equal to the distance between the positions of the selector shaft. The carriage frame 14 carries a centrally disposed forwardly directed lever 31 which is pivotally supported at its rear end and extends forwardly into its engagement with the progressing ratchet 30, this end being provided with a suitable engaging portion 31a. During forward movement of the carriage frame 14, the lever 31 engages the ratchet 30 and rotates it the correct distance between adjacent positions of the selector shaft, the movement of the ratchet 30 approximating such a distance and the centering disk 27 accurately centering the shaft upon such movement. The teeth of the progressing ratchet 30 are so positioned that when the selector shaft 22 is set for a low position, which is the position shown in Fig. 6, the center ratchet is engaged upon return movement of the carriage frame; thereby automatically setting the selector finger for second position. When the clutch is again operated, the selector is set for high position, then upon further movement the selector is set for alternate position. As will be pointed out hereinafter, when the selector is moved to alternate position, the gear shifting mechanism alternates between second and high positions; thus upon automatic advancing of the selector from low to high position and on to alternate position, the transmission is alternated between second and high so that the selector does not have to be operated.

In order that the alternator units may operate, the associated shifter fingers must be arranged with one catch 13b forwardly and the other rearwardly of the dogs or levers 25b. If the shifter fingers are so arranged that their shifter gear is in a neutral position, raising of the alternator unit raises both shifter fingers so that they clear the catches 16c carried by the carriage, and do not move the shifter gear. Thus, if the transmission is set in low or reverse and the selector handle is moved to position A, the transmission may be caused to alternate between low and reverse upon repeated movement of the clutch while the shifter gear of the other shifter fingers remains undisturbed in neutral position. Similarly, if the transmission is set in either second or high and the selector is subsequently set in position (A), the transmission is caused to alternate between second and high positions while the selector gear for low and reverse speeds remain undisturbed.

Thus both alternator units are simultaneously set but only one causes the alternating operation of the shifter fingers depending upon which selector gear occupies an operating position.

It is apparent from the description of the alternator unit and the progressive mechanism that the gear shift mechanism is semi-automatic in its operation, the selector being manually operated only when it is desired to use low or reverse positions. The several cams, centering disks, and progressive ratchets are separated by means of a cage which traverses the housing 10, and includes plates extending between the several cams, disks, and ratchets.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters Patent is:

1. In a gear shifting mechanism adapted to operate a vehicle transmission, wherein there are provided elements arranged in pairs and connected with each shifting gear of the transmission to effect opposite movement of said shifting gear from one operating position to the other through its neutral position, selector means for setting said elements, means for shifting said elements to dispose the shifting gears in a neutral position and to further act upon the selected element to move the corresponding shifting gear to an operating position; the combination with said selector means and each pair of elements, of an instrumentality arranged to be engaged by said selector means and to co-act with said elements, devices carried by said instrumentality and said elements arranged to select first one then the other of said elements upon repeated action of the shifting means causing the shifting gear connected with said elements to move from one operating position to another, and means arranged in cooperative relation therewith for rendering said instrumentality inoperative when set by said selector means while the elements coacting therewith retain the corresponding shifting gear in its neutral position.

2. In a gear shifting mechanism adapted to operate a vehicle transmission, wherein there are provided elements arranged in pairs and connected with each shifting gear of the transmission to effect opposite movement of said shifting gear from one operating position to the other through neutral position, selector means for setting said elements, means for shifting said elements to dispose the shifting gears in a neutral position and to further act upon the selected element to move the corresponding shifting gear to an operating position; the combination with said selector means, each pair of elements and the shifting gear operated thereby, of an instrumentality engaged by said selector means and to co-act with each pair of said elements, said instrumentalities arranged to be engaged in unison by said selector, devices on said instrumentalities and said elements arranged to select first one then the other of said elements upon repeated action of the shifting means causing the corresponding shifting gear to move back and forth from one operating position to the other, said devices arranged so as to be inoperative when set by said selector means while the elements co-acting therewith retain the corresponding shifting gear in its neutral position, whereby the instrumentality set into operation is selected by first setting the corresponding shifting gear in an operative position.

3. The combination with a vehicle transmission shifting mechanism including shifting gears each adapted to occupy operating positions and neutral positions therebetween, of a gear shifting mechanism, comprising, a unit connected with each shifting gear for moving the same in opposite directions through neutral to operating position, means for setting said units to effect any of the possible movements of said shifting gears, a mechanism for shifting said units in conformity with the setting of said means, an alternating means for each unit actuated by said setting means there being provided devices connected with said alternating means and said unit to cause action of said unit first in one setting then in another setting to effect back and forth movement of the corresponding shifting gear, and means for rendering said alternator means inoperative upon being set when the corresponding unit and its shifting gear are in neutral positions, thereby causing a selection of the unit occupying an operating position and rejection of the unit occupying a neutral position.

4. The combination with a transmission gear shifting mechanism wherein there is provided, pairs of reciprocal shifter fingers having operating movements in one direction and return movement in the opposite direction, each pair of shifter fingers being connected with a shifter gear of a transmission to effect opposite movements thereof, and shifting means engageable with said shifter fingers, which is so arranged that engagement of both fingers of a pair therewith limit movement of the associated shifter gear to a neutral position and engagement of only one shifter finger therewith enables the shifting means to move the associated shifter gear into an operating position; of a projection extending from each shifter finger, an alternator unit for each pair of shifter fingers comprising, a support and a pair of catch levers carried thereby, each catch lever being yieldable to engagement from one side and fixed against engagement from the other side, means for moving said alternator units into and out of coactive relation with said projections, each catch lever when co-acting with a corresponding projection, adapted to yield to said projection upon movement of the associated shifting finger in one direction, and to engage the projection to move the shifting finger clear of the shifting means upon movement of the shifter finger in the opposite direction, whereby the shifter gear associated therewith is moved from one operating position to another upon repeated operation of said shifter means.

5. The combination with a transmission gear shifting mechanism wherein there is provided, pairs of reciprocal shifter fingers having operating movements in one direction and return movements in the opposite direction, each pair of shifter fingers being connected with a shifter gear of a transmission to effect opposite movements thereof, and shifting means engageable with said shifter fingers which is so arranged that engagement of both fingers of a pair therewith limit movement of the associated shifter gear to a neutral position and engagement of only one shifter finger therewith enables the shifting means to move the associated shifter gear into an operating position; of a projection extending from each shifter finger, an alternator unit for each pair of shifter fingers comprising, a support and a pair of catch levers carried thereby, each catch lever being yieldable to engagement from one side and fixed against engagement from the other side, means for moving said alternator units into and out of co-active relation with said projections, each catch lever when co-acting with a corresponding projection, adapted to yield to said projection upon movement of the associated shifting finger in one direction, and to engage the projection to move the shifting finger clear of the shifting means upon movement of the shifter finger in the opposite direction, whereby the shifter gear associated therewith is moved from one operating position to another upon repeated operation of said shifter means, said catch levers of each alternator disposed so as to engage both projections of the corresponding pair of shifter fingers upon setting of the alternator unit when the associated shifter gear is in a neutral position whereby both shifter fingers are moved clear of said shifter means.

6. The combination with a transmission gear shifting mechanism in which there is provided, pairs of reciprocal shifter fingers having operating movements in one direction and return movements in the opposite direction, shifting means engageable with said shifter fingers, and means for selecting the shifter fingers; and a vehicle transmission wherein there is provided shifter gears one for each pair of shifter fingers, of a rack member connected with each shifter finger, a gear interposed between the racks for each pair of shifter fingers whereby the racks and their shifter fingers are caused to move in opposite directions, link means connecting one of each pair of racks with a shifter gear whereby corresponding pairs of shifter fingers have uni-directional operating movements to effect opposite movements of said shifter gear, said racks and their shifting fingers arranged to move equal amounts, and an element interposed in one of said link means for shifting one of said shifter gears a less distance than the other.

7. In the combination as set forth in claim 2 wherein the vehicle transmission has several forward speeds determined by the shifting gears and the selector means has corresponding positions for setting the shifting gears through action of the shifting means upon the several elements, the provision of a device including, an operating member connected with the shifting means, an operated member carried by the selector means, said members being engageable upon repeated action of said shifting means to move said selector means into its several positions for selecting corresponding speeds of the transmission, said members thereupon moving said selector means into engagement with said instrumentalities whereby the further action of said shifting means alternates the transmission between two of its forward speeds.

8. In the combination as set forth in claim 3 wherein the vehicle transmission has several forward speeds and one of the shifting gears determines an intermediate and a high speed for the transmission, of a device including a first member connected with the shifting mechanism, a second member carried by the setting means, said setting means having a position for each of the forward speeds of the transmission wherein the units are selected to shift the shifting gears in response to movement of said shifting mechanism, the members adapted to co-act and to move the setting means through the several positions determining the forward speeds of the transmission upon repeated action of the shifting mechanism and to further move the setting means into engagement with said alternating means whereby the above mentioned shifting gear is caused to alternate between an intermediate and high positions.

9. In the combination as set forth in claim 3 wherein the vehicle transmission has several forward speeds and one of the shifting gears and the corresponding unit determine an intermediate and high speed for the transmission, and the setting means is arranged to occupy positions for selecting the several forward speeds as well as the position causing action of the alternating means, of a ratchet wheel carried by the setting means for turning the setting means through its several forward speed determining positions to its position co-active with said alternating means, and an arm member carried by said shifting mechanism engageable with said ratchet wheel to move the setting means one position with each action of the shifting mechanism until said alternating means is caused to co-act with the shifting gear and unit determining the intermediate and high positions of the transmission.

10. The combination with a vehicle transmission shifting mechanism including shifting gears each adapted to occupy operating positions and neutral positions therebetween, of a gear shifting mechanism, comprising, a unit connected with each shifting gear for moving the same in opposite directions through its neutral to its operating positions, means for setting said units to effect any of the possible movements of said shifting gears, a mechanism for shifting said units in conformity with the setting of said means, an alternating means for each unit actuated by said setting means there being provided devices including gear and opposed rack means connected with said alternating means and said unit to cause action of said unit first in one setting then in another setting to effect back and forth movement of the corresponding shifting gear, and means for rendering said alternator means inoperative upon being set when the corresponding unit and its shifting gear are in neutral positions, thereby causing a selection of the unit occupying an operating position and rejection of the unit occupying a neutral position.

11. The combination with a transmission gear shifting mechanism wherein there is provided, pairs of reciprocal shifter fingers having operating movements in one direction and return movement in the opposite direction, each pair of shifter fingers being connected with a shifter gear of a transmission to effect opposite movements thereof, and shifting means engageable with said shifter fingers, which is so arranged that engagement of both fingers of a pair therewith limit movement of the associated shifter gear to a neutral position and engagement of only one shifter finger therewith enables the shifting means to move the associated shifter gear into an operating position; of a projection extending from each shifter finger, an alternator unit for each pair of shifter fingers comprising, a support and a pair of catch levers carried thereby, each catch lever being yieldable to engagement from one side and fixed against engagement from the other side, means including gear and opposed racks for moving said alternator units into and out of coactive relation with said projections, each catch lever when coacting with a corresponding projection, adapted to yield to said projection upon movement of the associated shifting finger in one direction, and to engage the projection to move the shifting finger clear of the shifting means upon movement of the shifter finger in the opposite direction, whereby the shifter gear associated therewith is moved from one operating position to another upon repeated operation of said shifter means.

12. The combination with a transmission gear shifting mechanism wherein there is provided, pairs of reciprocal shifter fingers having operating movements in one direction and return movements in the opposite direction, each pair of shifter fingers being connected with a shifter gear of a transmission to effect opposite movements thereof, and shifting means engageable with said shifter fingers which is so arranged that engagement of both fingers of a pair therewith limit movement of the associated shifter gear to a neutral position and engagement of only one shifter finger therewith enables the shifting means to move the associated shifter gear into an operating position; of a projection extending from each shifter finger, an alternator unit for each pair of shifter fingers comprising, a support and a pair of catch levers carried thereby, each catch lever being yieldable to engagement from one side and fixed against engagement from the other side, means including gear and opposed racks for moving said alternator units into and out of coactive relation with said projections, each catch lever when coacting with a corresponding projection, adapted to yield to said projection upon movement of the associated shifting finger in one direction, and to engage the projection to move the shifting finger clear of the shifting means upon movement of the shifter finger in the opposite direction, whereby the shifter gear associated therewith is moved from one operating position to another upon repeated operation of said shifter means, said catch levers of each alternator disposed so as to engage both projections of the corresponding pair of shifter fingers upon setting of the alternator unit when the associated shifter gear is in a neutral position whereby both shifter fingers are moved clear of said shifter means.

OVID E. MARK.